(12) United States Patent
Huang et al.

(10) Patent No.: US 11,402,554 B2
(45) Date of Patent: Aug. 2, 2022

(54) INDEX GRATING OF OPTICAL ENCODER

(71) Applicant: HIWIN MIKROSYSTEM CORP., Taichung (TW)

(72) Inventors: Ting-Wei Huang, Taichung (TW); Chin-Sung Liu, Taichung (TW); Tsan-Lin Chen, Taichung (TW)

(73) Assignee: HIWIN MIKROSYSTEM CORP., Taichung (TW)

(\*) Notice: Subject to any disclaimer, the term of this patent is extended or adjusted under 35 U.S.C. 154(b) by 226 days.

(21) Appl. No.: 16/990,829

(22) Filed: Aug. 11, 2020

(65) Prior Publication Data
US 2022/0050233 A1 Feb. 17, 2022

(51) Int. Cl.
*G02B 5/18* (2006.01)
*G01D 5/347* (2006.01)
*G02B 27/42* (2006.01)

(52) U.S. Cl.
CPC ....... *G02B 5/1866* (2013.01); *G01D 5/34715* (2013.01); *G02B 27/4255* (2013.01)

(58) Field of Classification Search
CPC .. G02B 5/1866; G02B 27/4255; G02B 5/005; G02B 5/18; G02B 2005/1804; G02B 5/1861; G02B 27/42; G02B 27/4233; G01D 5/34715; G01D 5/347; G01D 5/34707; G01D 5/3473; G01D 5/34746; G01D 5/34776
USPC ....... 359/574, 558, 566, 569, 572, 573, 575, 359/232, 234, 235, 236; 250/229, 231.1, 250/231.13, 231.14, 231.15, 231.17, 250/231.18
See application file for complete search history.

(56) References Cited

U.S. PATENT DOCUMENTS

| | | | | |
|---|---|---|---|---|
| 5,210,409 A | \* | 5/1993 | Rowe | G01D 5/38 250/237 G |
| 2007/0125939 A1 | \* | 6/2007 | Yaku | G01D 5/34746 250/237 G |
| 2011/0220781 A1 | \* | 9/2011 | Batchelder | G01D 5/34715 250/231.13 |

\* cited by examiner

*Primary Examiner* — Arnel C Lavarias
(74) *Attorney, Agent, or Firm* — Guice Patents PLLC

(57) ABSTRACT

An index grating of an optical encoder provided by the invention has a main technical feature of increasing a ratio of light-transmissible area of a grating per unit area, thereby increasing a light source utilization efficiency and a signal intensity, and reducing light-blocking ratio caused by dust and other foreign matters, thereby reducing a degree of influence on light intensity, so as to improve a sensing precision of the optical encoder.

7 Claims, 3 Drawing Sheets

INDEX GRATING OF OPTICAL ENCODER

BACKGROUND OF THE INVENTION

Field of Invention

The invention relates to position sensing technology, and more particularly to an index grating of an optical encoder.

Related Art

The encoder that uses sine wave signal to analyze the position employs a light sensor to receive the different light intensity changes with the rotation of a code disk, and then analyzes to obtain the current position. In order to produce an ideal sine wave, reduce the amount of mathematical operation required for analysis, and obtain the precise positioning of the applied components, in the conventional technology, the result of the ideal light intensity changes during rotation of the code disk is obtained by means of changing the shape of the light receiving area, the shape of the light shield, or the shape of the grating.

Please refer to a conventional index grating structure shown in FIG. 1, which is provided on a grating plate (1) with a plurality of light-transmitting areas (2) arranged juxtapositionally in sequence and roughly in the shape of an numeral eight, thereby changing a light source being transmitted or reflected through a main grating, and then after passing through an index grating, light intensity changes can be sensed by an optical sensing element to obtain a sine wave signal that is close to ideal, thereby improving a precision of analysis to obtain an accurate position.

However, due to the increasingly demanded requirements of precision machinery for position analyze precision, considering the conventional technology shown in FIG. 1, the technical content of the light-transmitting areas (2) is still not sophisticated enough, resulting in the analyze precision, accuracy and even the ability to avoid interference provided have their limitations, and it is difficult to fully meet the precision required by precision machinery.

SUMMARY OF THE INVENTION

Therefore, main objects of the invention is to provide an index grating of an optical encoder capable of improving a light source utilization efficiency of the optical encoder, strengthening a signal strength and reducing a degree of interference caused by foreign objects.

In order to achieve the above objects, the index grating of the optical encoder provided by the invention has a main technical feature of increasing a ratio of light-transmissible area of a grating per unit area, thereby increasing a light source utilization efficiency and a signal intensity, and reducing light-blocking ratio caused by dust and other foreign matters, thereby reducing a degree of influence on light intensity, so as to improve a sensing accuracy of the optical encoder.

In order to increase a ratio of light-transmissible area per unit area, the invention provides a technique to make the index grating of the optical encoder have a plurality of first light-transmitting areas and a plurality of second light-transmitting areas of a same shape, which are crisscross arranged in sequence on a grating plate, make the first light-transmitting areas close to a first side of the grating plate and away from a second side opposite to the first side, at the same time make the second light-transmitting areas close to the second side and away from the first side, make the first light-transmitting areas and the second light-transmitting areas have a same length of shape between a first end and a second end, make a width of shape to increase gradually from the first end toward the second end, at the same time make the second end of the first light-transmitting areas to dispose between the first end thereof and the first side, make the second end of the second light-transmitting areas to dispose between the first end thereof and the second side, and wherein, make a distance (D) between the second end of the first light-transmitting area and the second end of the second light-transmitting area that are adjacent to each other, and a length (L) of shape of the first light-transmitting area or the second light-transmitting area to satisfy a formula: $L \leq D < 2L$. In this way, an area ratio of the light-transmitting areas provided by the first light-transmitting areas and the second light-transmitting areas can be increased per unit area to achieve the above-mentioned objects and efficacies.

Wherein, a preferred ratio between the length (L) and the distance (D) is $D=1.274 L$ or $D=1.196 L$.

Further, a sensing signal can be made closer to an ideal sine wave signal, a shape of each of the first ends and each of the second ends can be respectively made circular, elliptical, parabolic or hyperbolic, and at the same time an area between the first end and the second end with widths varying in a long axis direction can be made trapezoidal.

DETAILED DESCRIPTION OF THE INVENTION

Figure 1:
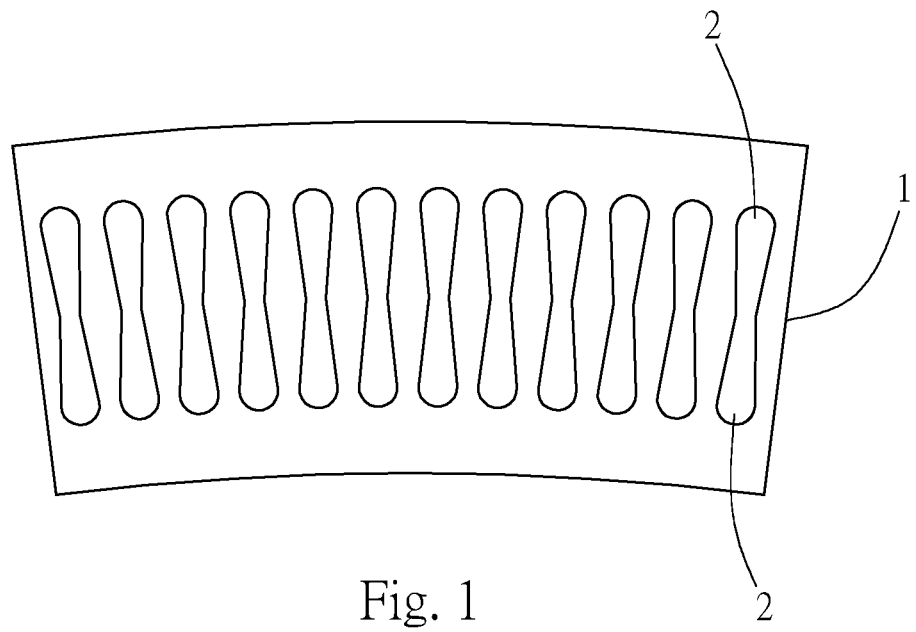
FIG. 1 is a plan view of a conventional index grating.
Figure 3:
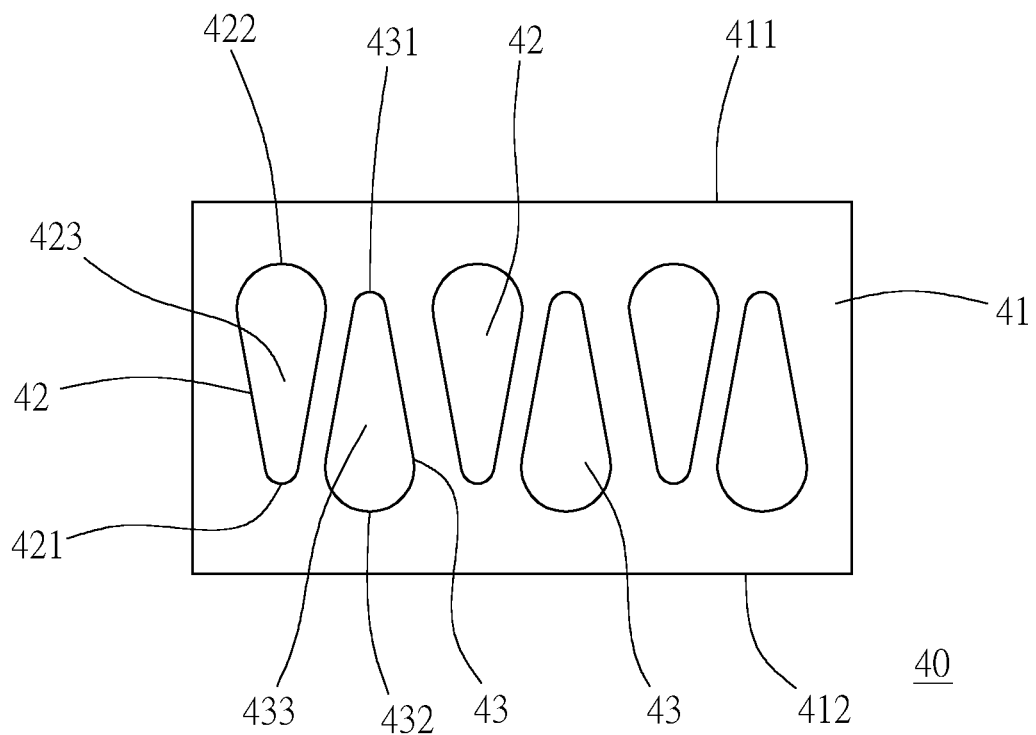
FIG. 3 is a plan view of an index grating in one preferred embodiment of the invention.
Figure 2A:
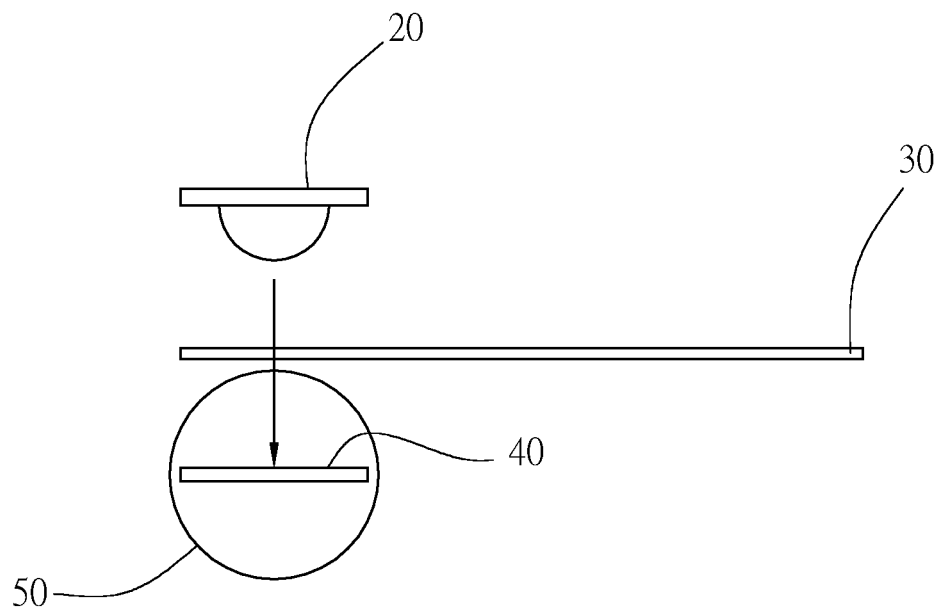
FIG. 2A is a schematic diagram of one preferred embodiment of the invention showing a transmission type main grating.
Figure 2B:
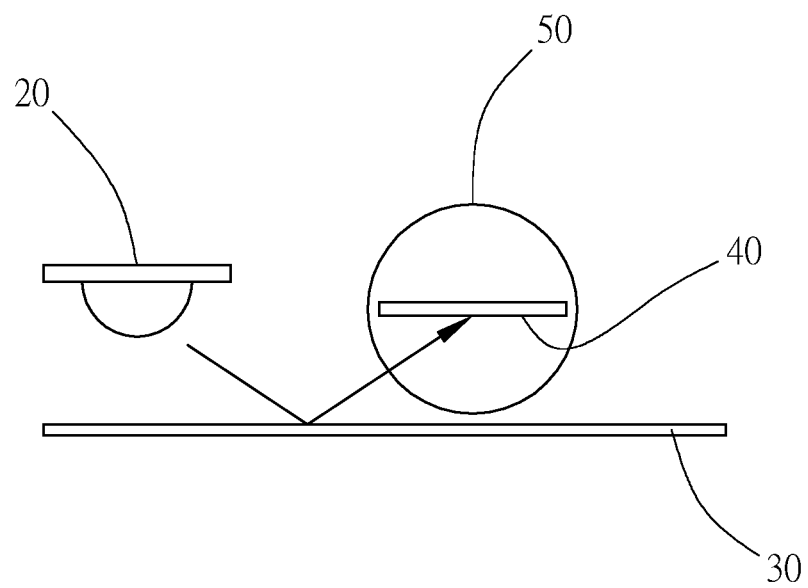
FIG. 2B is a schematic diagram of one preferred embodiment of the invention showing a reflective type main grating.

Firstly, please refer to FIGS. 2A, 2B and 3, an optical encoder (10) provided in one preferred embodiment of the invention mainly includes a light source (20), a main grating (30), an index grating (40) and an optical sensing part (50).

The working principle and relative spatial positional relationship between the constituent elements of the optical encoder (10) are similar to those disclosed in the prior art. Light produced by the light source (20) is reflected (as shown in FIG. 2B) by the main grating (30), that is, a code disc, or allowed to pass through (as shown in FIG. 2A) the main grating (30), and then sensed by the optical sensing part (50) through the index grating (40), a signal obtained through light intensity changes sensed by the optical sensing part (50) can be used as a basis for mathematical operation to analyze a rotation angle position of a rotating element connected to the main grating (30) to facilitate control, and wherein, the optical sensing part (50) can include a plurality of photosensitive elements, however this is a technical subject disclosed in the prior art and not intended to be improved by the invention, so there is no need to repeat in details here.

Wherein, the index grating (40) structurally includes a grating plate (41), a plurality of first light-transmitting areas (42) and a plurality of second light-transmitting areas (43).

Shape and size of the grating plate (41) can be adapted to be installed on the optical sensing part (50). In this embodiment, a rectangular platelike body is taken as an example.

Each of the first light-transmitting areas (42) and each of the second light-transmitting areas (43) mutually form a three-dimensional structure on the grating plate (41) through which light can pass through, and respectively form a same two-dimensional shape on one side surface of the grating plate (41) to be crisscross arranged in sequence along a rectangular long axis direction of the grating plate (41) so as to mutually form a light-transmitting area on the grating plate (41) that allows light to pass through.

Figure 4:
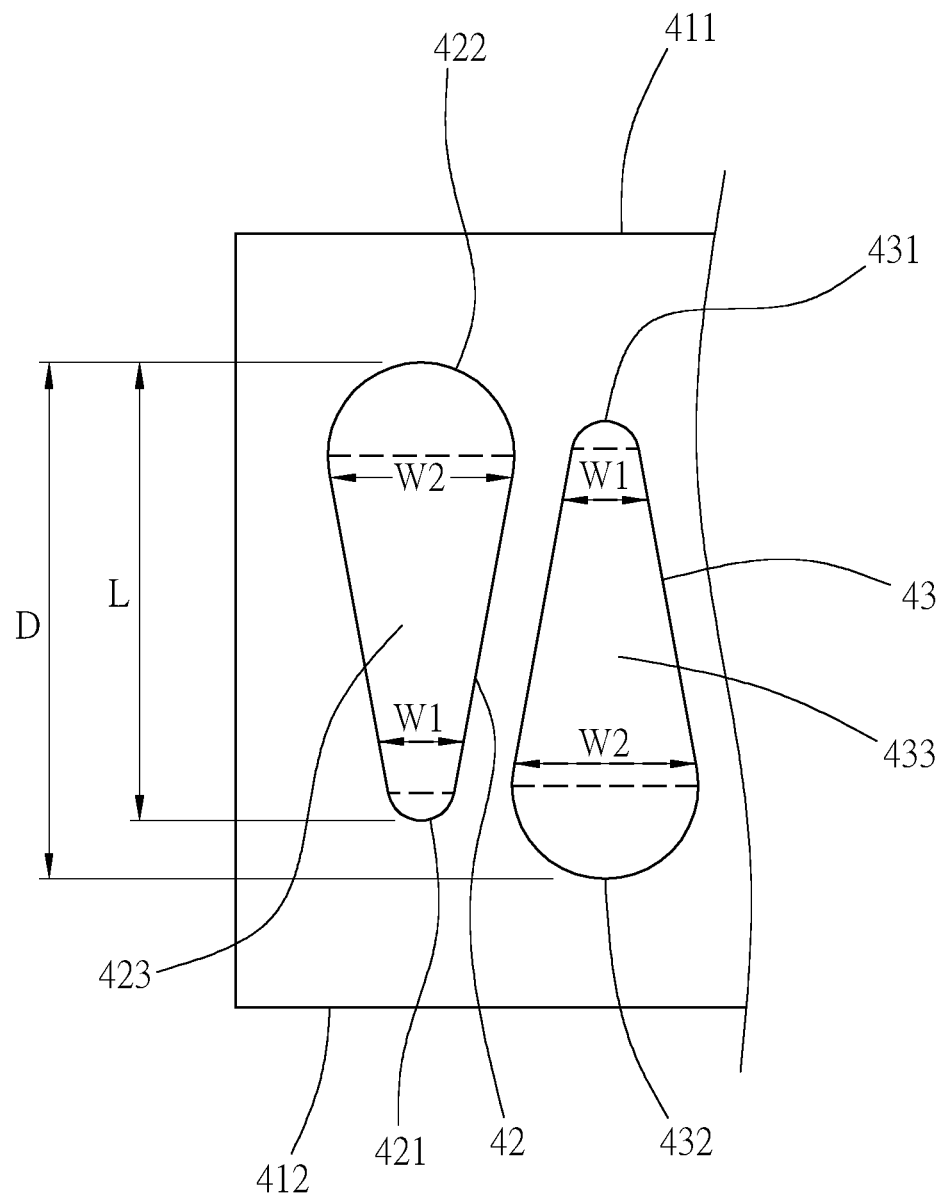
FIG. 4 is a partial enlarged view of one preferred embodiment of the invention.

Please refer to FIG. 4, in terms of the two-dimensional shape formed by each of the first light-transmitting areas (42) and each of the second light-transmitting areas (43) on one side surface of the grating plate (41), a length (L) of shape of each of the first light-transmitting areas (42) and each of the second light-transmitting areas (43) is between a first end (421) (431) and a second end (422) (432), and a width of shape gradually increases from the first end (421) (431) to the second end (422) (432) to form a narrower width (W1) adjacent to the first end (421) (431), and a larger width (W2) adjacent to the second end (422) (432), so that an overall shape is roughly in the shape of a water drop. Furthermore, a shape of each of the first ends (421) (431) and a shape of each of the second ends (422) (432) are respectively arcuate, and a curvature of an arc matches a curvature of a circular, an elliptical, a parabolic or a hyperbolic shape. In this embodiment, each of the first ends (421) (431) and each of the second ends (422) (432) are respectively arcuate, and a radius of each of the first ends (421) (431) is made smaller than a radius of each of the second ends (422) (432) to correspond to changes in its own width. Further, a width of shape of each of the first light-transmitting areas (42) and each of the second light-transmitting areas (43) changes to form a trapezoidal area (423) (433) in their respective shapes between the corresponding first end (421) (431) and second end (422) (432). Wherein, for ease of understanding, in the invention, dotted lines are drawn as imaginary dividing lines in FIG. 4 to form the trapezoidal area (423) between each of the first ends (421) and each of the second ends (422) corresponding to each other, and to form the trapezoidal area (433) between each of the first ends (431) and each of the second ends (432) corresponding to each other, but the imaginary dividing lines do not actually exist.

In terms of the relative relationship with the grating plate (41):

each of the first light-transmitting areas (42) is close to a first side (411) of one side of a rectangular long axis of the grating plate (41) and away from a second side (412) opposite to the first side (411), and the second end (422) thereof is made to dispose between the first end (421) thereof and the first side (411);

each of the second light-transmitting areas (43) is close to the second side (412) and away from the first side (411), and the second end (432) thereof is made to dispose between the first end (431) thereof and the second side (412).

With the relative state of each of the first light-transmitting areas (42) and each of the second light-transmitting areas (43) crisscrossing with each other, a distance (D) between the second ends (422) (432) of the two adjacent first light-transmitting area (42) and second light-transmitting area (43) is less than twice the length (L) of their respective shapes, thereby a light-transmitting area provided by each of the first light-transmitting areas (42) and each of the second light-transmitting areas (43) per unit area of the grating plate (41) can be achieved.

Further, by changing a depth at which each of the first light-transmitting areas (42) and each of the second light-transmitting areas (43) crisscrossing each other, light intensity changes sensed by the optical sensing part (50) can be closer to a sine wave signal, and by increasing a proportion of light-transmitting area per unit area, better light source utilization can be achieved, so that the optical sensing part (50) is capable of increasing a quantity of photosensitive elements (not shown in the figures) thereof with a higher proportion of light-transmitting area, so as to improve an error caused by uneven light intensity; at the same time, with the densely disposed photosensitive elements, a degree of influence of abnormal signals produced by foreign matters affecting the traveling of light can be reduced, thereby the optical encoder (10) is capable of providing a more precise sensing result.

Under feasible implementation conditions, a crisscross depth between each of the first light-transmitting areas (42) and each of the second light-transmitting areas (43) satisfies a formula: $L \leq D < 2L$ to achieve the objects and efficacies of the invention. In one preferred embodiment, more preferably $D=1.274 L$ or $D=1.196 L$. Under this condition, when being used in certain devices, the optical encoder (10) is capable of achieving relatively better sensing precision.

It is to be understood that the above description is only preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. An index grating of an optical encoder comprising:
   a grating plate;
   a plurality of first light-transmitting areas arranged in sequence on the grating plate; and
   a plurality of second light-transmitting areas arranged in sequence on the grating plate, and respectively disposing between each of the adjacent first light-transmitting areas; wherein
   the first light-transmitting areas are close to a first side of the grating plate and away from a second side opposite to the first side, the second light-transmitting areas are close to the second side and away from the first side;
   each of the first light-transmitting areas and each of the second light-transmitting areas have a same shape, a length (L) of shape is made between a first end and a second end of each of the first light-transmitting areas and each of the second light-transmitting areas, a width of shape is made to increase gradually from the first end toward the second end, at the same time the second end of shape of the first light-transmitting areas is respectively made to dispose between the first end thereof and the first side, and the second end of shape of the second light-transmitting areas is respectively made to dispose between the first end thereof and the second side; and
   a distance (D) between the second end of the first light-transmitting area and the second end of the second light-transmitting area that are adjacent to each other, and a length (L) of shape of the first light-transmitting area or the second light-transmitting area are made to satisfy a formula: L≤D<2 L.

2. The index grating of the optical encoder as claimed in claim 1, wherein D=1.274 L.

3. The index grating of the optical encoder as claimed in claim 1, wherein D=1.196 L.

4. The index grating of the optical encoder as claimed in claim 1, wherein a shape of each of the first ends is respectively a part of a circular, an elliptical, a parabolic or a hyperbolic shape.

5. The index grating of the optical encoder as claimed in claim 4, wherein a shape of each of the second ends is respectively a part of a circular, an elliptical, a parabolic or a hyperbolic shape.

6. The index grating of the optical encoder as claimed in claim 5, wherein a diameter of each of the first ends is smaller than a diameter of each of the second ends.

7. The index grating of the optical encoder as claimed in claim 1, wherein portions of shape of each of the first light-transmitting areas and each of the second light-transmitting areas disposing between the first end and the second end are trapezoidal respectively.

* * * * *